O. J. FAJEN.
GEAR SHIFTING DEVICE.
APPLICATION FILED JUNE 13, 1916.
1,266,438.
Patented May 14, 1918.
3 SHEETS—SHEET 3.
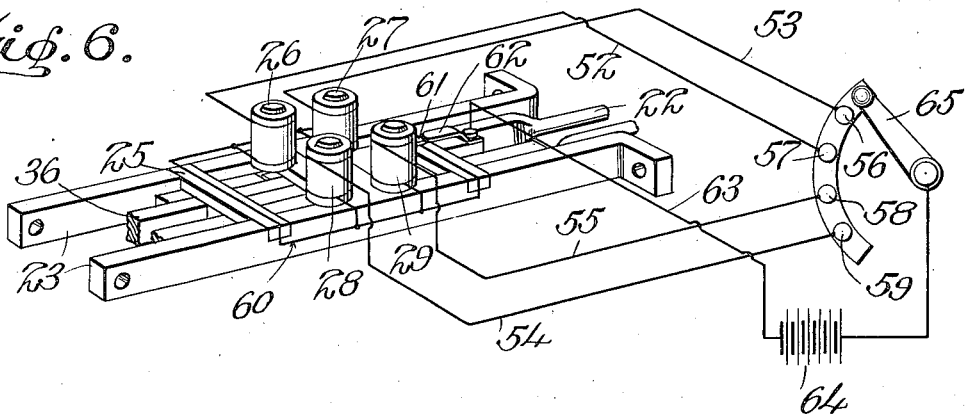
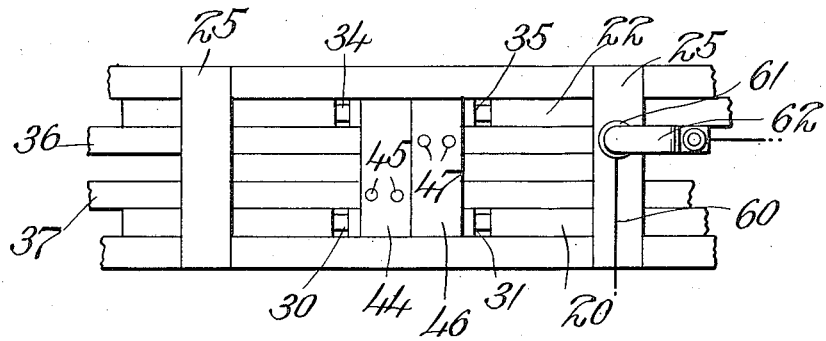
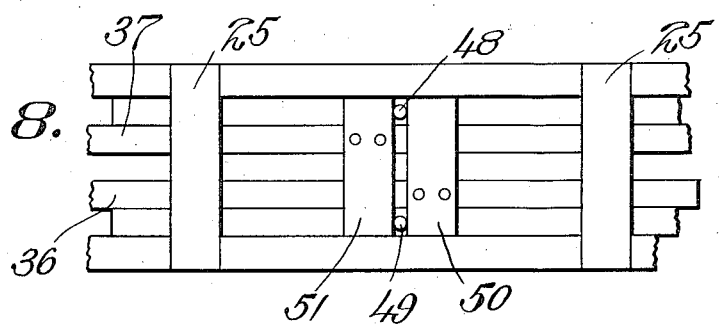
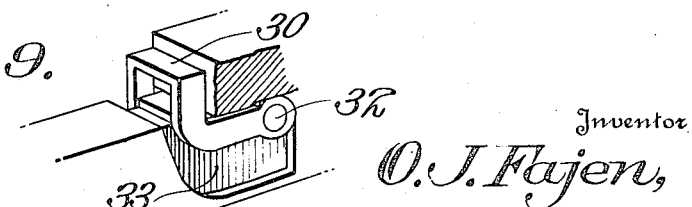
Inventor
O. J. Fajen,
Witnesses
By
Attorneys

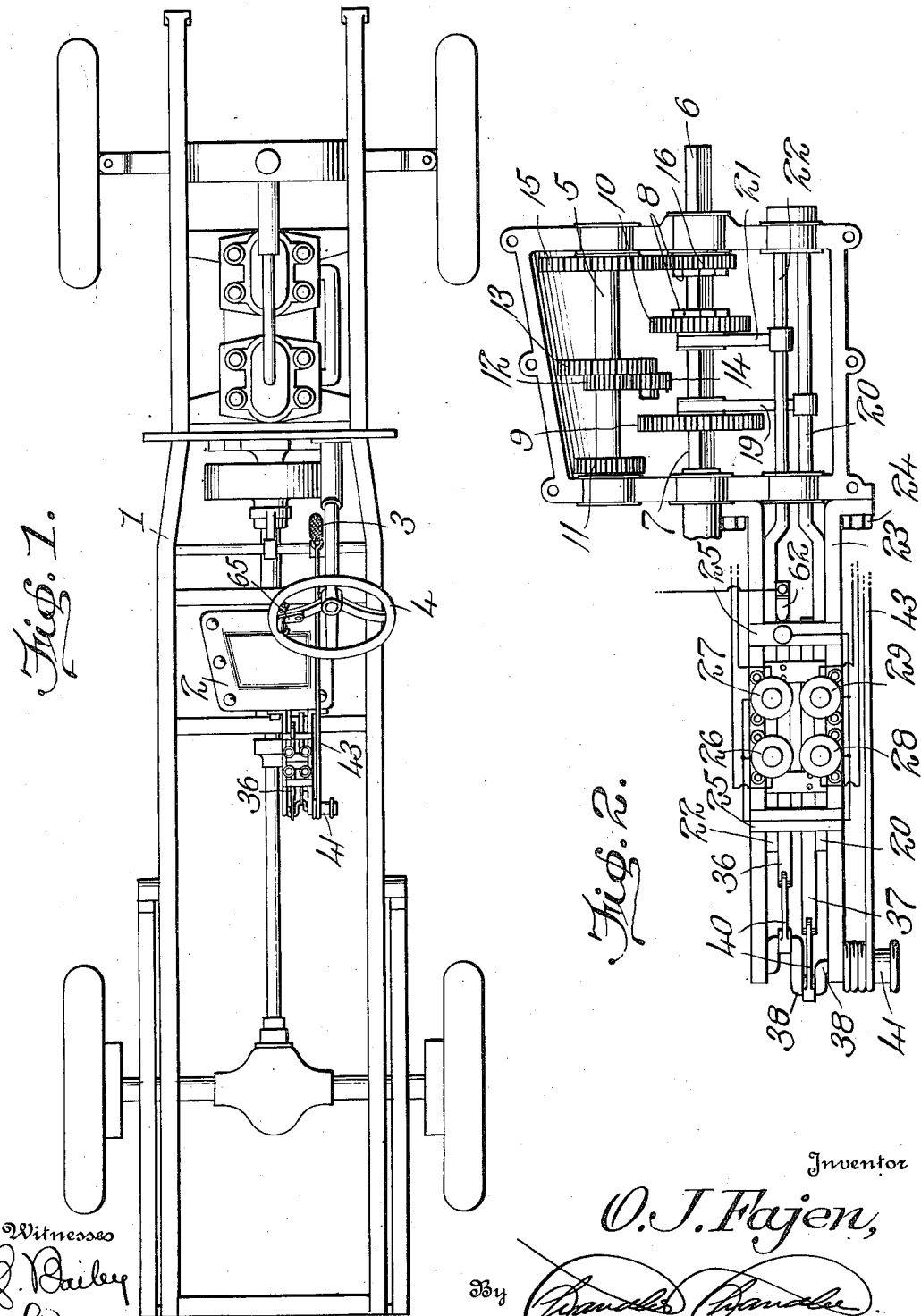

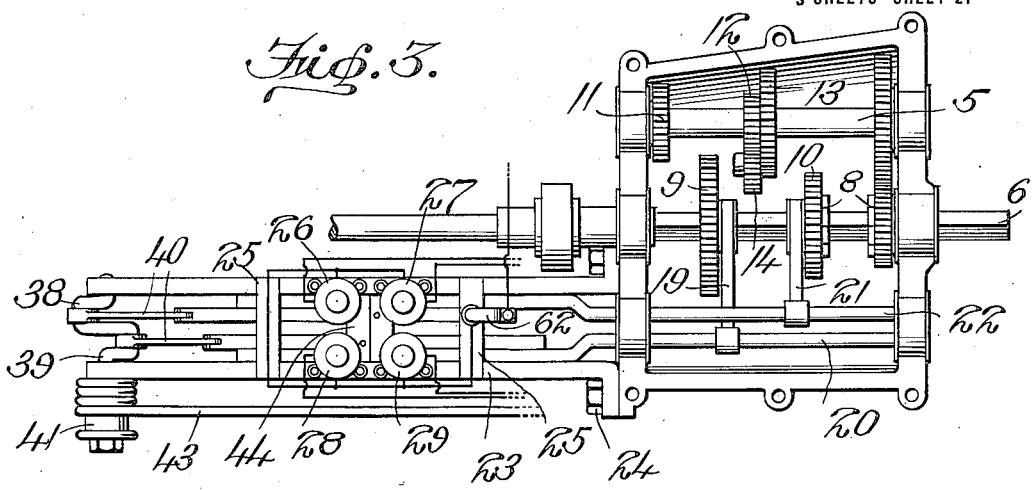
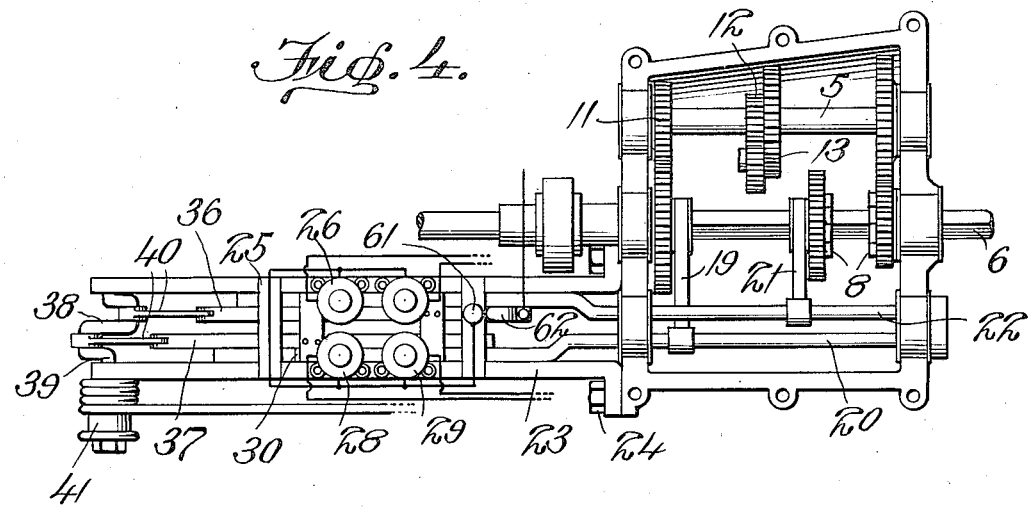
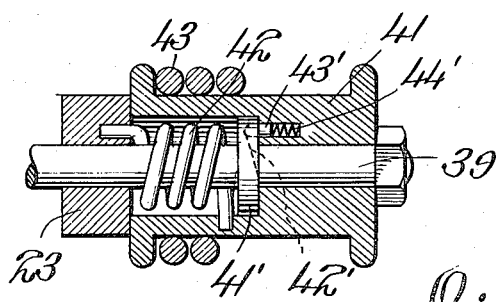

UNITED STATES PATENT OFFICE.

OTTO J. FAJEN, OF STOVER, MISSOURI.

GEAR-SHIFTING DEVICE.

1,266,438.  Specification of Letters Patent.  Patented May 14, 1918.

Application filed June 13, 1916. Serial No. 103,476.

*To all whom it may concern:*

Be it known that I, OTTO J. FAJEN, a citizen of the United States, residing at Stover, in the county of Morgan, State of Missouri, have invented certain new and useful Improvements in Gear-Shifting Devices; and I do hereby declare the following to be a full, clear, and exact description of the invention, such as will enable others skilled in the art to which it appertains to make and use the same.

This invention relates to a gear shifting device.

An object of the invention resides in the provision of a device for shifting the transmission gears of the automobile positively and for connecting the gears to the shifting means selectively by electrically controlled means.

A further object of the invention resides in the provision of a device of this character which will be operated by the clutch pedal when the latter is depressed and the clutch rendered inoperative.

A further object of the invention resides in so constructing the device that the gears will be moved into neutral during the initial movement of the clutch pedal and so that the proper gears will move into interengaging relation upon the further movement of the clutch pedal.

A still further object of the invention resides in the provision of a gear shifting device which may be readily attached to the transmission gears of the selective type used at the present time.

With these and other objects in view, such as will appear as my description progresses, my invention comprises the combination and arrangement of parts as set forth in and falling within the scope of the appended claims.

In the drawing:

Figure 1 is a plan view of the chassis of an automobile showing my invention applied thereto;

Fig. 2 is a detail plan view of my device showing the same attached to the transmission gears and showing the positions of the various parts when the gears are in their neutral positions and the clutch pedal is in its normal or raised position;

Fig. 3 is a similar view showing the positions of the parts when the clutch pedal has been partly depressed;

Fig. 4 is a similar view showing the positions of the parts when the clutch pedal has been further depressed and the gears have been shifted into the first speed;

Fig. 5 is a detail sectional view of the operating pulley;

Fig. 6 is a conventional representation of the device disclosing the wiring system;

Fig. 7 is a top plan view with the magnets removed;

Fig. 8 is a bottom plan view with the elements in the positions they will occupy when the pedal is partially depressed, and Fig. 9 is a perspective view of one of the members which acts as an armature for one of the magnets and attaches the shifting slide for the gears operatively to the crank shaft of the device.

In the drawing I have illustrated, conventionally, an automobile chassis which includes a frame 1, a transmission gear casing 2 in which the usual selective transmission gears are mounted, a clutch pedal 3 and a steering wheel 4. The transmission gearing includes a usual idle shaft 5, the driving shaft 6 and the driven shaft 7, between which shafts 6 and 7, a clutch 8 is interposed. Gears 9 and 10 are secured to the driven shaft 7 while gears 11, 12 and 13 are secured to the idle shaft 5. A pinion 14 intermeshes with the gear 12. Intermeshing gears 15 and 16 are secured, respectively, to the shafts 5 and 6 so that motion is transmitted from the driving shaft to the idle shaft 5. When the gear 9 intermeshes with the gear 11 the shaft 7 will be driven at low speed and when it intermeshes with the pinion 14 the shaft 7 will be driven in the reverse direction. When the gear 10 intermeshes with the gear 13 the shaft 7 will be driven at intermediate speed and when the members of the clutch 8 interengage the drive will be direct between the shaft 6 and the shaft 7. The gear 9 is adapted to be shifted into engagement with the gear 11 or the pinion 14 by a shipper lever 19 which is secured to a shifting slide 20 and the gear 10 together with the clutch member which it carries are adapted to be shifted by a shipper lever 21 which is carried by a shifting slide 22.

These slides 20 and 22 extend through the casing 2 and in order that they may be operated to shift the gears to produce the speeds indicated above and the reverse, I have secured, to the casing 2, a pair of spaced bars 23 which are held in place by suitable bolts 24 and between which the extended portions of the slides 20 and 22 are located. These bars 23 are joined by pairs of spaced cross bars 25 between which the slides 20 and 22 extend.

Mounted on the bars 23 and extending inwardly therefrom are electromagnets 26, 27, 28 and 29, the axes of which are vertical. Secured to the slide 20 are U-shaped metal clips 30 and 31 which are pivoted, at 32, and which are adapted to seat in cut-out portions 33 in the slide or to project upwardly therefrom in a manner disclosed in Fig. 9 of the drawing. These clips are arranged so that they will act as the armatures of the magnets 28 and 29, respectively. Similar clips 34 and 35 are mounted on the slides 22 and coact, as armatures, with the magnets 26 and 27.

A pair of connecting slides 36 and 37 is mounted between the slides 20 and 22 and the members of this pair are movable simultaneously in opposite directions and independently of the slides 20 and 22. These slides 36 and 37 are connected to oppositely arranged crank portions 38 of a shaft 39 by means of links 40 and are movable upon the actuation of the shaft. Secured to this shaft is a pulley 41 in which a spring 42 is mounted, one end of the spring being secured to the adjacent bar 23 and the other end to the pulley so that the shaft 39 will normally be held in a predetermined position. An operating cable 43 is wound upon the pulley 41, extends and is secured to the clutch pedal 3. A plate 44 is secured to the slide 37, at 45, and extends completely across and in slight spaced relation to the upper faces of the slides 20, 22 and 36, being entirely free from these latter slides. A second plate 46 is secured, at 47, to the slide 36 and extends across the slides 20, 22 and 37, being entirely free from these latter slides. When any one of the magnets 26 to 29, inclusive, is energized one of the armatures 30, 31, 34 or 35 will be attracted and raised about its pivot so that it will contact with the edge of the adjacent plate 44 or 45 in a manner which will later appear. Rigidly secured to and extending downwardly from the slides 20 and 22 are pins 48 and 49 which are adapted to engage the edges of plates 50 and 51 which are respectively secured to the connecting slides 36 and 37. The adjacent edges of these plates are adapted to be engaged by the pins 48 and 49 so that when the plates are moved in one direction the slides 20 and 22 will likewise be moved as will later appear.

The magnets are included in open circuits which include wires 52, 53, 54 and 55 which extend, respectively, from the magnets 26 to 29, inclusive, to contact points 56 to 59, inclusive. Wires extend from the other ends of the coils of the magnets to a common wire 60 which is connected to a contact 61 carried by the cross bar 25 which extends between the bars 23 and is located adjacent to the casing 2. A spring contact 62 is secured to the connecting slides 36 and is adapted to engage the contact 61 from which spring contact a wire 63 extends to a battery 64 and thence to a switch 65 which is adapted to engage, selectively, the contacts 56 to 59, inclusive. These latter contacts and the switch 65 are located on the steering wheel 4 of the automobile so that the energizing of the magnets will be entirely under the control of the operator.

Now assuming that the clutch pedal is up and the gears are in their neutral positions as illustrated in Fig. 2, the plates 44 and 46 will be separated to their greatest distances but the armatures 30, 31, 34 and 35 will be located beneath the magnets 26 to 29, inclusive. When the operator depresses the pedal 3 partially the crank shaft 39 will be given one-half of a revolution and this will reverse the positions of the connecting slides 36 and 37 and move the plates 44 and 45 so that their adjacent edges contact and their outer edges lie free of the armatures 30, 31, 34 and 35. Now if one of the magnets is energized by the closing of the circuit in which it is included, it will be drawn upwardly and will engage the edge of the adjacent plate 44 or 46 so that upon the further depression of the pedal 3 and the consequent revolution of the shaft 39 the plates 44 and 46 will be moved apart to their initial position as shown in Fig. 4 and the slide on which the engaged armature is mounted will be moved in one direction so that the gears will be shifted. The direction of movement of the slide 20 or 22 and the slide which is moved depends upon the magnet which is energized as will be readily understood.

When the clutch pedal 3 has been completely depressed the crank shaft 39 will have completed a revolution of course. When the armature passes out of the lines of force of the magnet there will be a tendency for it to move downwardly which movement will be prevented as long as the connecting slide is moving but when the slide completes its movement the armature will be permitted to drop. When the clutch pedal 3 is allowed to rise and the clutch to engage, the gears will have been shifted and the cable 43 will rewind on the pulley 41 ready for another operation. When the clutch pedal is again depressed, partially the pin 48 or 49 on the shifting slide, which has previously been moved, will be engaged by the plate 50 or 51 on the connecting slide which has been moved and the shifting slide will be moved to its initial or normal neutral position with the plates 44 and 46 in contact.

It is of course to be understood that the operator may move the switch 65 into engagement with any one of the contacts 56 to 59, inclusive, at any time that he desires. The circuit to the particular magnet will not be closed however until the clutch has been partially depressed and the crank shaft 39 has completed one-half of a revolution. At this time the connecting slide 36 will have moved until the spring contact 62 engages the contact member 61. The engagement of these contacts 61 and 62 completes the circuit and energizes the magnet so that the armature for the particular magnet is raised into position.

Referring to Fig. 5 of the drawing it is to be noted that a collar 41' is secured to the shaft 39, in which collar a cam slot 42' is formed. A pin 43' is mounted in the pulley 41 and is normally urged into said slot by a coil spring 44' so that when the pulley is rotated in one direction by the cable 43 the shaft 39 will likewise be rotated but when the pulley is rotated in the opposite direction under the influence of the spring 42 the pin 43' will ride out of the slot 42' and permit the pulley to rotate free of the shaft which latter will remain stationary.

While I have illustrated and described a particular embodiment of my invention, it has merely been for the sake of convenience and I do not wish to be limited to that particular embodiment as it is obvious that numerous changes may be made in the details of construction without departing from the spirit of the invention or exceeding the scope of the appended claims.

What I claim is:—

1. In combination with a transmission gear of automobiles, shifting slides for the gears, manually actuated slides independent of the gear slides, pivoted means carried by the gear slides for operatively connecting them to the manually operating slides, and electromagnetic means for operating said pivoted connecting means.

2. The combination with selective transmission gears, of shifting slides for said gears, manually operated slides, means for connecting the shifting slides with the manually operated slides and carried by the shifting slides, and selective magnetic means for rendering said connecting means operative.

3. The combination with selective transmission gears, of shifting slides for said gears, separate means for operating said shifting slides, means carried by the shifting slides and adapted to connect them with the operating slides, and electromagnetic means for controlling the connecting means.

In testimony whereof, I affix my signature, in the presence of two witnesses.

OTTO J. FAJEN.

Witnesses:
 D. L. MORRIS,
 MARIAN F. MOORE.